United States Patent
Sorens et al.

(10) Patent No.: US 6,317,848 B1
(45) Date of Patent: Nov. 13, 2001

(54) SYSTEM FOR TRACKING AND AUTOMATICALLY COMMUNICATING PRINTER FAILURES AND USAGE PROFILE ASPECTS

(75) Inventors: Michael J. Sorens, West Linn; Kerry A. Montgomery, Lake Oswego, both of OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/160,468

(22) Filed: Sep. 24, 1998

(51) Int. Cl.$^7$ ........................................................ H02H 3/05
(52) U.S. Cl. ................................ 714/48; 710/19; 713/502
(58) Field of Search .......................... 714/48, 47; 710/19; 713/502

(56) References Cited

U.S. PATENT DOCUMENTS

| | | | |
|---|---|---|---|
| 4,586,147 | 4/1986 | Tadokoro | 364/550 |
| 4,700,295 | * 10/1987 | Katsof et al. | |
| 5,038,319 | 8/1991 | Carter et al. | 364/900 |
| 5,057,866 | 10/1991 | Hill, Jr. et al. | 355/200 |
| 5,101,233 | 3/1992 | Ito et al. | 355/209 |
| 5,177,680 | * 1/1993 | Tsukino et al. | |
| 5,305,055 | 4/1994 | Ebner et al. | 355/200 |
| 5,343,276 | 8/1994 | Yamashita et al. | 355/202 |
| 5,361,265 | 11/1994 | Weinberger et al. | 371/29.1 |
| 5,394,458 | 2/1995 | Allen et al. | 379/1 |
| 5,448,277 | * 9/1995 | Long | |
| 5,636,008 | 6/1997 | LoBiondo et al. | 399/8 |
| 5,649,120 | 7/1997 | Motoyama | 395/280 |
| 5,715,496 | 2/1998 | Sawada et al. | 399/8 |
| 5,727,248 | 3/1998 | Ogura | 399/8 |
| 6,003,070 | * 12/1999 | Frantz | |
| 6,141,662 | * 10/2000 | Jeyachandran | |

OTHER PUBLICATIONS

Sixth Sense Technology, Xerox 5800 High Performance Copier, Sep. 11, 1997, 17 p.
Observer, Lexmark's 'MarkTrack' Softward Tracks Printer Usage Throughout the Enterprise, Aug. 1998, 2 pages.
Observer, QMS Introduces Bsize Magicolor Color Laser Printer, Sep. 1998, 5 p.

* cited by examiner

Primary Examiner—Paul R. Myers

(57) ABSTRACT

Upon particular occurrences, such as a page being printed, a printer job done, an error event or a passing of a day, data is recorded to non-volatile memory (NVRAM) to record data over time. Once a trigger event occurs such as an error, a pattern of occurrences of printer conditions, a passage of a certain amount of time, a number of pages printed, a POSTSCRIPT snippet sent, a user command or a command via the World Wide Web (WWW), an email is automatically sent to a number of email addresses selected by the user. The email contains specially formatted encoded data that was previously recorded over time upon an occurrence as described above.

14 Claims, 3 Drawing Sheets

SYSTEM FOR TRACKING AND AUTOMATICALLY COMMUNICATING PRINTER FAILURES AND USAGE PROFILE ASPECTS

BACKGROUND OF THE INVENTION

The present invention relates to data capture and reporting capabilities, and more particularly to collecting, storing and sending out printer usage and failure data to user-selected destinations.

Printers are more complicated because they are being asked to do more. At the same time, more first-time or novice users are purchasing color printers. Both trends highlight the need for "smarter" printers which are easier to use and service. Many users cite the need for timely information about their printers. Prior solutions for this purpose have been to track usage of larger printer and copiers, with the goal being to spot potential problems before they happen and to track usage for tighter cost containment. However, such systems have not appeared in desktop printers.

In order to solve this problem, QMS Inc. developed CROWNVIEW which, as disclosed in the September 1998 issue of *The Hard Copy Observer* (Volume VIII Number 9), sends an error message via email to system administrator or to a designated mailing list. In addition, users can remotely view consumables usage data. However, in order to prevent or predict future service problems, there is a need for notification on regular intervals, not just on error condition. There is also a need for this communication on regular intervals to contain information of not only consumable usage but other usage information, and for patterns of usage to be communicated in a usable format to the manufacturer.

What is desired is an inexpensive system for tracking a wide range of printer usage aspects and failures and communicating such information upon a pre-determined condition and at regular intervals to the user and manufacturer in a format usable for spotting potential problems before they happen and tracking usage for: tighter cost containment, the improvement of future products and avoiding down time due to consumables reaching end of life.

SUMMARY OF THE INVENTION

Accordingly, the present invention provides an inexpensive system for tracking a wide range of printer usage aspects and failures. The system communicates such information upon a pre-determined condition and at regular intervals to the user and manufacturer in a format usable for spotting potential problems before they happen. Upon particular occurrences, such as a page being printed, a printer job done, an error event or a passing of a day, data is recorded to non-volatile memory (NVRAM) in the printer. Once a trigger event occurs, for example, an error or a passage of a certain amount of time, or a pattern of printer occurrences an email is automatically sent to a number of email addresses selected by the user. The email contains specially formatted encoded data that was previously recorded upon an occurrence as described above.

The objects, advantages, and other novel features of the present invention are apparent from the following detailed description when read in conjunction with the appended claims and attached drawing.

DESCRIPTION OF THE PREFERRED EMBODIMENT

Figure 1:
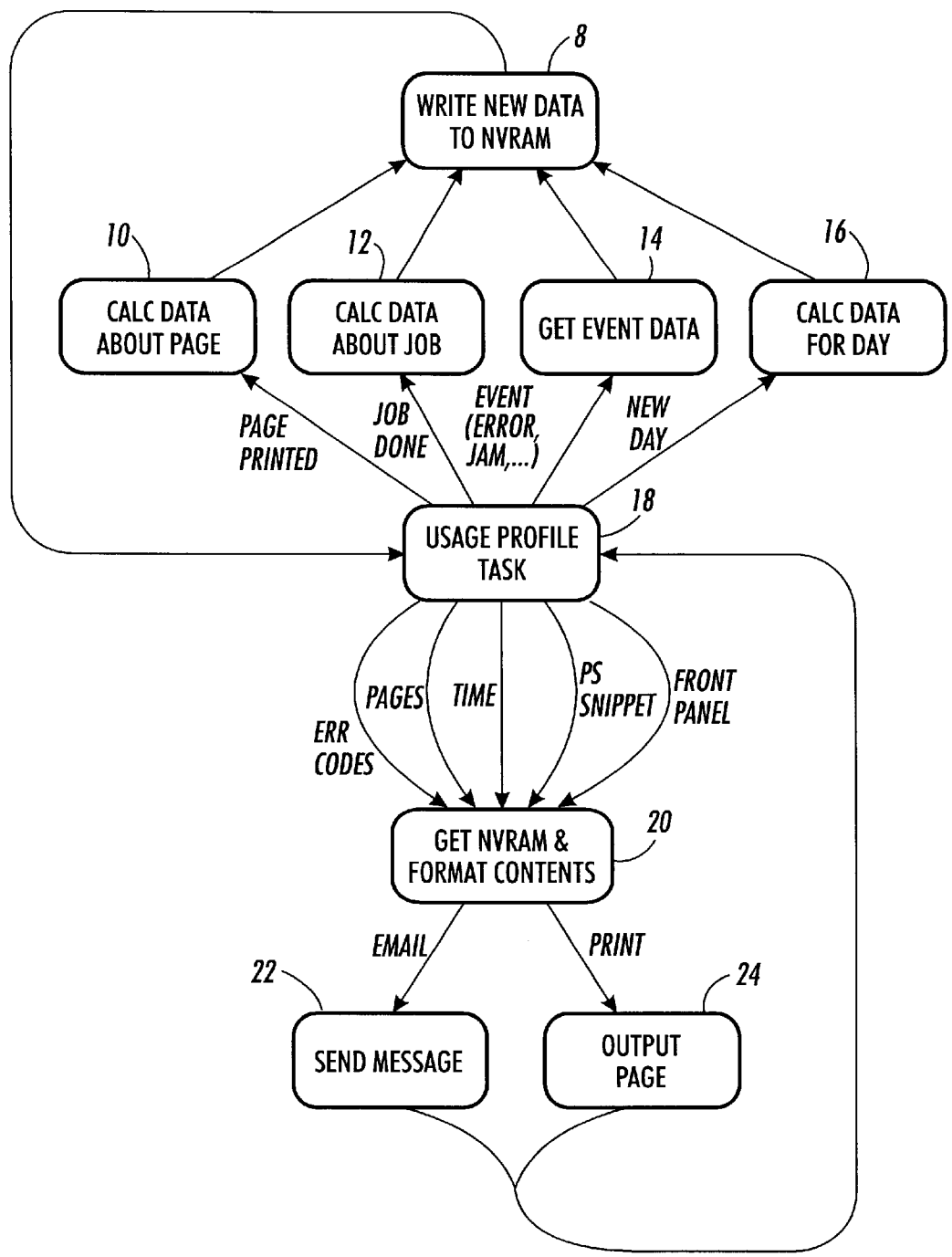
FIG. 1 is a block diagrammatic view of a system for tracking and automatically communicating printer failures and usage profile aspects.

Referring to FIG. 1, a system for tracking and automatically communicating printer failures and usage profile aspects is shown. A Usage Profile Task 18 detects an occurrence of a printer condition which causes a data collection. In the preferred embodiment shown in FIG. 1, such an occurrence is an event occurrence (such as turning on power, opening a cover, a jam, a door open, tray removed, or button pushed), a page printed, a printer job completion, or a time event such as a day passing.

Once an occurrence as described above is detected by the Usage Profile Task 18, data is collected based upon what type of occurrence was detected. When there is a page occurrence, data is calculated about that page 10. When a printer job is completed, data is calculated about that printer job 12. When an event occurs, data about that particular event is collected 14. When an amount of time has passed, 1 day in the preferred embodiment, data is collected for that day. In the preferred embodiment, there are essentially five types of printer condition data collected: a quantity count (e.g. how many hours in state x?), a count of occurrences (e.g. how many times was the printer turned on?), a histogram of occurrences for each possible state (e.g. how many times was a door opened, categorized by top, middle, bottom?), a true histogram of possible values for one condition (e.g. for the pages per day distribution, 0 pages/day, 1 page/day, 2 to 5 pages/day, 6 to 10 pages per day, and so forth), and a "rolling" histogram that records the last few values of a certain condition (e.g. the last 5 jam locations and the media type used).

In the preferred embodiment, the data collected includes, but is not limited to: hours powered on, hours off-line, system reset log, pages imaged, pixels imaged, consumables gas gauges, jams, hours in Energy Star mode (an energy saving mode), temperature, humidity, consumable replacements, pages per day distribution, copies per job distribution, and feature usage.

All the above data is written to non-volatile memory (NVRAM) 8. When the printer is turned on for the first time, the NVRAM is initialized and a seal is stored on the NVRAM indicating this. Once this seal is in place, subsequent power-ups will not initialize the NVRAM.

Upon certain event triggers the data stored in NVRAM is formatted 20 and a report is sent containing the data, via email in the preferred embodiment 22, selectively to the manufacturer, and up to three other user-defined email addresses. In addition the data is retrieved upon demand by local service personnel through a parallel port, and the data is printed upon demand via a command through a printer front panel 24. The event triggers in the preferred embodiment include: major engine errors or jam sequences, a pattern of occurrences of printer conditions; a front panel request generated by a user, a POSTSCRIPT snippet sent to the printer, a manufacturer request for data via email (sends a snippet); a command via the Internet or World Wide Web (WWW), and every 3.5 calendar days or every 500 copies, whichever comes first. A POSTSCRIPT "snippet" is a piece of code written in the POSTSCRIPT programming language which usually performs some control function in the printer to which it is sent (as contrasted with code that actually specifies something to print). The number of pages or days in an event trigger is configurable by sending POSTSCRIPT snippets to the printer.

For an email report to the manufacturer 22, data will be encoded with tokens identifying each data item rather than textual messages. The casual reader will not be able to interpret the data without a token table. However this provides a moderate degree of security. However, a user may configure the email report sent to the user as textual or encoded.

The email portion of the invention is enabled or disabled by a command via the WWW, separately for the user and manufacturer and will be disabled initially. The data collection occurs independently of this.

An encoded report generated by any trigger uses the same format, which includes a full report on all statistics tracked. The format is a human-readable text message (7-bit ASCII) limited to the standard alphanumeric characters plus punctuation.

The report will consist of a series of data-items. Each item consists of a token-value pair, and is terminated by a semi-colon. The value is a scalar or a comma-separated list, or it may be empty.

There are two sections to the report, the header and the body. The header identifies the printer that is sending the report and when the report was created (note this will generally be different than the time stamp on the email itself, which indicates when the message was sent). The body contains a series of items for all defined data. Order is not significant. Each pre-defined token will appear exactly once in the list. In the preferred embodiment, every report generated has a syntax defined by the grammar below. White space in the message is not significant

| <report> | ::= <rpt-header> <end-header-token> <rpt-body> <end-token> |
|---|---|
| <rpt-header> | ::= { <data-item> } |
| <end-header-token> | ::= %%% |
| <rpt-body> | ::= { <data-item> } |
| <end-token> | ::= End Usage Profile Report |
| <data-item> | ::= <data-token> = <value> { , <value> } ; |
| <data-token> | ::= positive integer from a token table |
| <value> | ::= single data value | where
::= means "is defined as"
<x> means some entity named "x"
{ } means zero or more occurrences
Boldface denotes a literal
Italics denotes a placeholder for the described value The <data-token> shown above distinguishes between an item in the header (0<token<100) and an item in the body (token>100). A portion of a sample token table demonstrates this.

| Sample Token Table | | |
|---|---|---|
| <id-token> | 1 | (These are header tokens) |
| <name-token> | 2 | |
| <type-token> | 3 | |
| <firmware-token> | 4 | |
| ... | | |

| Sample Token Table | | |
|---|---|---|
| <starting-time-stamp> | 101 | (These are body tokens) |
| <power-on> | 102 | |
| <prints-since-last-jam> | 113 | |
| ... | | |

The <value> shown above is an integer in most cases, though may also be a string. The email report, however, is sent as plain ASCII text 22, not as binary, so the host side software reads each character up to the item terminator (;). Then, the <data-token> is parsed, and each <data-token> expects a specific data-type for its <value> list. If there is more than one <value>, commas (,) are used as value separators.

Figure 2:
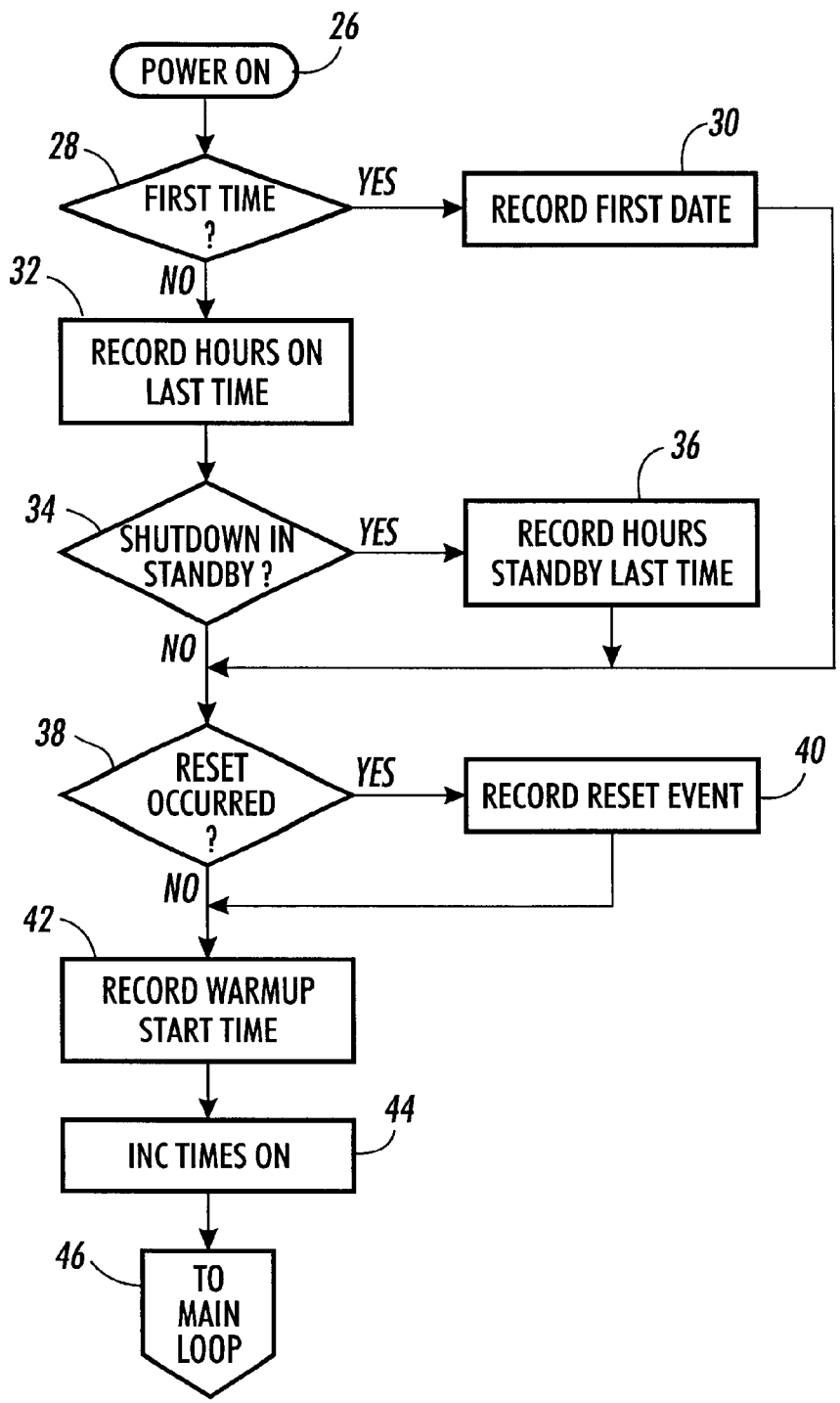
FIG. 2 is a flowchart of the initial tasks of a system for tracking and automatically communicating printer failures and usage profile aspects.

An example of a portion of an emailed report 22 is as follows:

1=193DK374J32; 2=Phaser 740; 4=2015.105 (14); %%% 102=242;
113=14,2500,1,1,534; End Usage Profile Report Whereas the same data in a printed report 24 is as follows:
Printer ID=193DK374J32
Printer Name=Phaser 740
Printer Firmware=2015.105 (14)
Poweron=242
Prints Since Last Jam=14,2500,1,1,534
End Usage Profile Report Referring to FIG. 2, a flowchart of the initial tasks that a system for tracking and automatically communicating printer failures and usage profile aspects performs is shown.

Upon powering on of the printer 26, the system checks for whether it is the first power on 28. If it is, then the first date is recorded (written to memory) 30 and the following steps 32, 34 and 36 are skipped. If not, then the hours that the printer was on the last time it was powered on is recorded 32. Next the system checks if there was a shutdown while the printer was in standby mode 34. If there was, then the hours the printer was on during standby are recorded 36. Next the system checks if there was a reset that had occurred 38. If there was, then that reset event is recorded 40. Next, the warmup start time is recorded 42 and the number of times the printer was turned on is incremented 44. The system then enters a main task loop 46.

Figure 3:
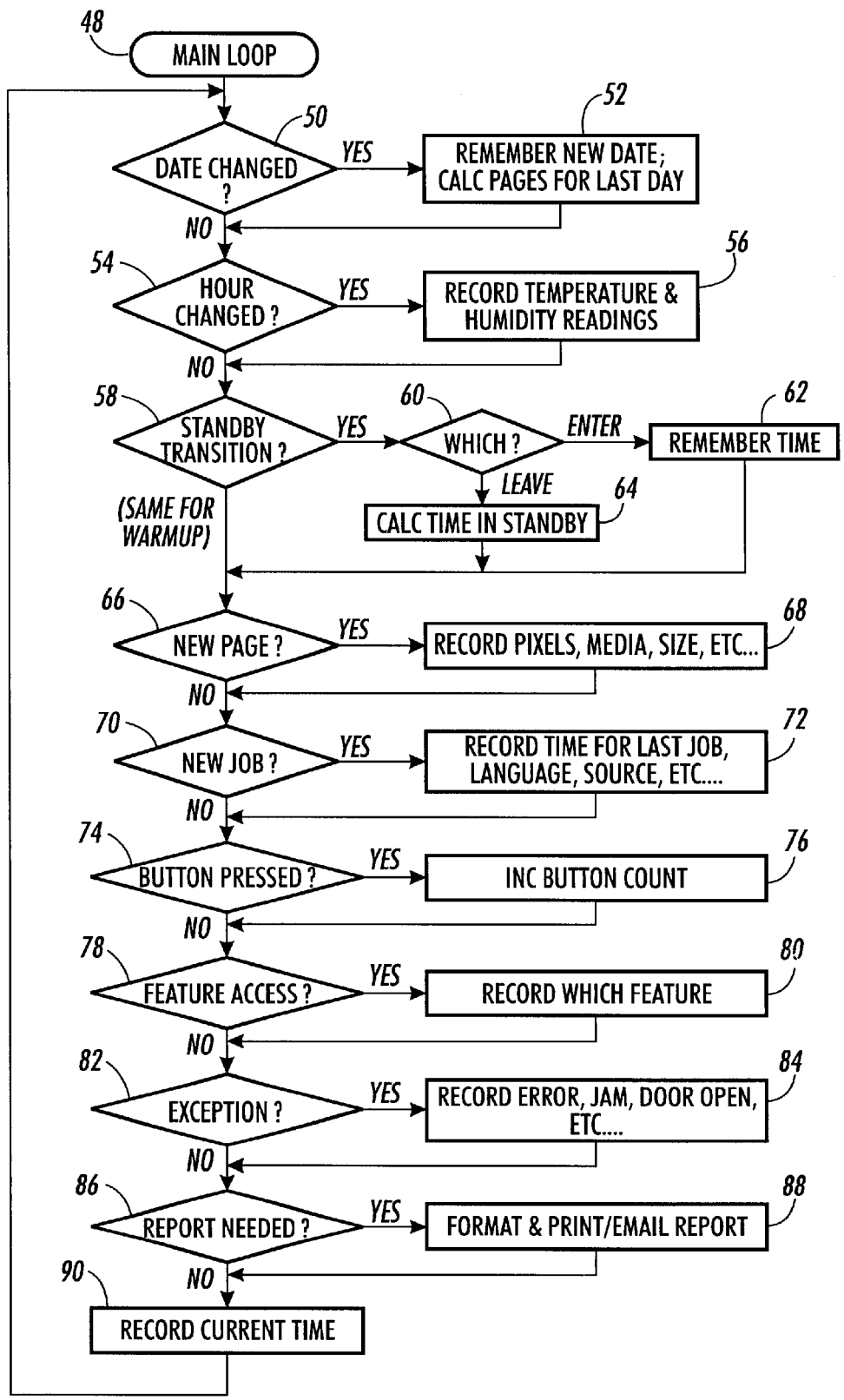
FIG. 3 is a flowchart of the main tasks of a system for tracking and automatically communicating printer failures and usage profile aspects.

Referring to FIG. 3, a flowchart of the main tasks that a system for tracking and automatically communicating printer failures and usage profile aspects performs is shown. After the system enters into a main loop 48 it determines whether the date has changed. If it has, then the new date is recorded and the number of pages printed the previous day is calculated and recorded 52. The system then determines whether the hour has changed 54. If it has, then the temperature and humidity readings are recorded 56. Next, the system determines whether there has been a transition either into or out of standby 58. If there has been, it is determined which standby transition was detected 60. If it was an enter into standby that was detected, then the time at which the transition occurred is recorded 62. If it was a leaving of standby that was detected, then the time the printer was in standby mode is calculated and recorded 64. Then the system determines whether a new page has been printed 66. If a page has been printed, then the number of pixels, media used, the page size and other page statistics as described above are recorded for that page 68. Then the system determines whether there is a new printer job 70. If there is, then the time recorded for the last job to complete, the source of the last job, and other job statistics are recorded as described above 72. Next, the system determines whether there was a button pressed on the printer 74. If there was, then a button count is incremented 76. Then the system determines whether there was a printer feature access by the user 78, such as calibrating colors, getting printer defaults and printing help pages. If there was, which feature was accessed is recorded 80. Then the system determines whether an exception has occurred such as an error, a jam or other event occurrence as described above 82. If there was, then that exception is recorded 84. Next, the system determines whether there is a report needed as determined by the conditions set forth above as event triggers 86. If there is, then a report is formatted and printed or emailed according to the particular event trigger as described above 88. After finishing the above step, the current time is recorded 90 and the system loops back to step 48. In the preferred embodiment, tasks above are functions called by other tasks where the data for a particular event is known. For example, when a new page is processed, instead of the task being performed directly in the main loop a printer engine task knows all of the relevant data about the page and will call the appropriate function to record those statistics.

Thus, the present invention provides an inexpensive system for tracking a wide range of printer usage aspects and failures and communicating such information upon a predetermined condition and at regular intervals to the user and manufacturer in a format usable for spotting potential problems before they happen.

While the invention has been described with reference to the embodiment disclosed, it is not confined to the details set forth, but is intended to cover such modifications or changes as may come within the scope of the following claims.

What is claimed is:

1. A method for tracking and communicating printer failures and usage profile aspects comprising the steps of:

detecting when a first predetermined amount of time has passed;

writing printer consumable usage data and printer condition data to non-volatile memory;

detecting an occurrence of a printer condition;

writing the printer consumable usage data and the printer condition data pertaining to the printer condition detected to non-volatile memory;

repeating the steps of detecting when a first predetermined amount of time has passed, writing printer consumable usage data and printer condition data to non-volatile memory, detecting an occurrence of a printer condition and writing the printer consumable usage data and the printer condition data pertaining to the printer condition detected to non-volatile memory, until either a second predetermined amount of time has passed, a predetermined number of pages have been printed, a predetermined command has been entered, a printer error has occurred or a pattern of occurrences of printer conditions has occurred;

sending an email message showing the printer consumable usage data and printer condition data written over the predetermined amounts of time, thereby communicating patterns of printer usage over time.

2. The method according to claim 1 wherein the first predetermined amount of time in the pre-determined amount of time detection step is 1 day.

3. The method according to claim 1 wherein the printer condition data are a quantity count, a count of printer occurrences, and a histogram of printer occurrences.

4. The method according to claim 1 wherein the printer condition in the step of detecting an occurrence of a printer condition is when a page is printed, when a printer job is completed, when a printer error occurs, when a door opens, when a tray is removed, or a button pushed.

5. The method according to claim 1 wherein the second predetermined amount of time is 3.5 calendar days.

6. The method according to claim 1 wherein the second predetermined amount of time is configurable by a user.

7. The method according to claim 1 wherein the predetermined number of pages having been printed in the repeating step is 500 pages.

8. The method according to claim 1 wherein the predetermined number of pages having been printed in the repeating step is configurable by a user.

9. The method according to claim 1 wherein the predetermined command is made by a user via a front panel on a printer.

10. The method according to claim 1 wherein the predetermined command is made via a POSTSCRIPT snippet sent to the printer.

11. The method according to claim 1 wherein the predetermined command is made via an email sent containing a POSTSCRIPT snippet to be sent to the printer.

12. The method according to claim 1 wherein the email message is sent to the manufacturer and to email addresses selectively chosen by a user.

13. The method according to claim 1 further comprising the step of printing out a report upon a predetermined command showing the printer consumable usage data and printer condition data written over the predetermined amounts of time.

14. The method according to claim 1 wherein the predetermined command is made via Internet.

* * * * *